United States Patent
Grech et al.

(10) Patent No.: US 12,209,536 B2
(45) Date of Patent: Jan. 28, 2025

(54) GAS TURBINE ENGINE

(71) Applicant: ROLLS-ROYCE plc, London (GB)

(72) Inventors: Nicholas Grech, Derby (GB); Matthew J. Willshee, Nottingham (GB); Jacopo Tacconi, Derby (GB)

(73) Assignee: Rolls-Royce plc (GB)

( * ) Notice: Subject to any disclaimer, the term of this patent is extended or adjusted under 35 U.S.C. 154(b) by 0 days.

(21) Appl. No.: 18/609,514

(22) Filed: Mar. 19, 2024

(65) Prior Publication Data
US 2024/0328359 A1    Oct. 3, 2024

(30) Foreign Application Priority Data
Mar. 28, 2023   (GB) ..................... 2304479

(51) Int. Cl.
| F02C 7/224 | (2006.01) |
| B64D 37/30 | (2006.01) |
| B64D 37/34 | (2006.01) |
| F02C 3/22  | (2006.01) |

(52) U.S. Cl.
CPC .............. *F02C 7/224* (2013.01); *B64D 37/30* (2013.01); *B64D 37/34* (2013.01); *F02C 3/22* (2013.01); *F05D 2220/323* (2013.01); *F05D 2260/213* (2013.01)

(58) Field of Classification Search
CPC . F02C 7/224; F02C 3/22; B64D 37/30; B64D 37/34; F05D 2220/323; F05D 2260/213
See application file for complete search history.

(56) References Cited

U.S. PATENT DOCUMENTS

| 5,292,595 | A | 3/1994 | Yamauchi et al. |
| 5,392,595 | A | 2/1995 | Glickstein et al. |
| 2020/0088098 | A1* | 3/2020 | Roberge ................ F02C 7/16 |
| 2020/0088102 | A1 | 3/2020 | Roberge |
| 2021/0190004 | A1* | 6/2021 | Todorovic ............. F02K 1/72 |
| 2022/0099020 | A1 | 3/2022 | Palmer |
| 2023/0076757 | A1* | 3/2023 | Rambo ................. F02K 1/40 |

FOREIGN PATENT DOCUMENTS

| GB | 919506 A | 2/1963 |
| GB | 2240813 A | 8/1991 |
| WO | 2024003083 A1 | 1/2024 |

OTHER PUBLICATIONS

Great Britain search report dated Sep. 7, 2023 issued in GB Patent Application No. 2304479.5.
European search report dated Jul. 2, 2024, issued in EP Patent Application No. 24160178.0.

* cited by examiner

*Primary Examiner* — David P. Olynick
(74) *Attorney, Agent, or Firm* — Barnes & Thornburg LLP

(57) ABSTRACT

A propulsive aircraft gas turbine engine comprises a turbine disposed in a gas turbine engine core flow and a recuperator heat exchanger disposed downstream of the turbine in gas turbine engine core flow, the recuperator heat exchanger being configured to transfer heat from the gas turbine engine core flow to gas turbine engine fuel. The recuperator heat exchanger is configured to accommodate a portion of the gas turbine engine core flow therethrough, the remainder being bypassed around the recuperator heat exchanger.

20 Claims, 7 Drawing Sheets

GAS TURBINE ENGINE

CROSS-REFERENCE TO RELATED APPLICATIONS

This specification is based upon and claims the benefit of priority from United Kingdom patent application number GB 2304479.5 filed on Mar. 28, 2023, the entire contents of which is incorporated herein by reference.

BACKGROUND

Technical Field

This disclosure relates to complex cycle gas turbine engines for aircraft.

Description of the Related Art

In order to limit emissions of carbon dioxide, use of hydrogen as an alternative to hydrocarbon fuel in gas turbine engines has historically only been practical in land-based installations. However, cryogenic hydrogen fueled airliners have recently been proposed. The fuel for such aircraft however must be heated prior to combustion. Doing so in a manner which is efficient from an overall propulsion system perspective is a significant challenge.

SUMMARY

The disclosure is directed towards a propulsive aircraft gas turbine engine comprising:
- a turbine disposed in a gas turbine engine core flow;
- a recuperator heat exchanger disposed downstream of the turbine in gas turbine engine core flow, the recuperator heat exchanger being configured to transfer heat from the gas turbine engine core flow to gas turbine engine fuel; wherein
- the recuperator heat exchanger is configured to accommodate a portion of the gas turbine engine core flow therethrough, the remainder being bypassed around the recuperator heat exchanger.

Advantageously, a portion of gas turbine engine core flow is unimpeded by the recuperator, allowing for improved core flow thrust recovery, while providing for recovery of exhaust heat from the gas turbine engine core to heat the fuel, thereby improving thermal efficiency of the gas turbine engine core, while minimising loss of propulsive efficiency.

The gas turbine engine may be configured to burn hydrogen fuel.

The recuperator may be installed adjacent a radially inner wall of a gas turbine core exhaust nozzle, and may be generally annular. The gas turbine engine exhaust nozzle may comprise a generally radially inner recuperator flow and a generally radially outer core bypass flow. Advantageously, the relatively slower moving core air adjacent the inner wall of the exhaust nozzle is transferred through the heat exchanger, rather than the higher velocity air at the outer wall. Consequently, heat exchange effectiveness is improved due to the longer dwell time within the heat exchanger matrix, and core exhaust thrust recovery is improved relative to where the higher velocity exhaust flow is used.

The recuperator may be provided within a core centre body of the gas turbine engine, aft of the turbine. Advantageously, space that is normally empty within the gas turbine engine is utilised for the recuperator.

The gas turbine engine may comprise a recuperator channel arranged to guide core flow from the turbine exit, through the recuperator heat exchanger, and out a recuperator exhaust.

The recuperator channel may be configured to redirect flow from a generally axial direction from the turbine exhaust to a generally radially inward flow through a heat exchange matrix of the recuperator heat exchanger. Advantageously, flow the heat exchange matrix can be oriented in a generally radial direction, allowing for a planar heat exchanger extending generally axially in its largest dimension. Consequently, a large surface area of heat exchange matrix can be provided, without occupying excessive space within the gas turbine engine, and without restricting main core gas flow.

The recuperator channel may be configured to redirect flow from a generally radially inward direction from the heat exchange matrix to a generally axial direction out the recuperator exhaust. Advantageously, heat exchanger exhaust flow can be used to generate core thrust.

The gas turbine engine may comprise an axially translating turbine centre body configured to vary an outlet area of the recuperator. Advantageously, exhaust flow can be modulated to control exhaust velocities depending on engine operational conditions.

The recuperator may be configured to accommodate between 10 and 25% of core engine flow, with the remainder being bypassed around the recuperator heat exchanger.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
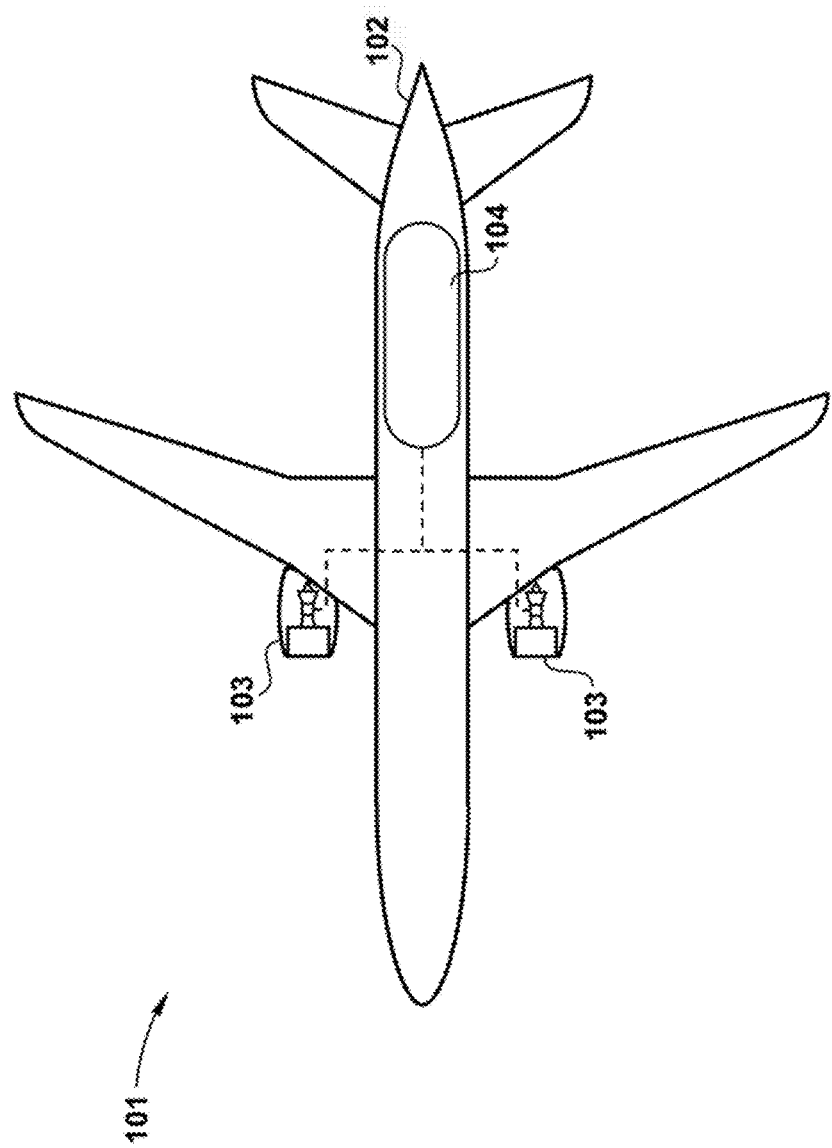
FIG. 1 shows a hydrogen-fueled airliner comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and substantially identical underwing-mounted turbofan engines 103. In the present embodiment, the turbofan engines 103 are geared turbofan engines.

A hydrogen storage tank 104 located in the fuselage 102. In the present embodiment, the hydrogen storage tank 104 is a cryogenic hydrogen storage tank and thus stores the hydrogen fuel in a liquid state, in a specific example at 25 kelvin. In this example, the hydrogen fuel is pressurised to a pressure from around 1 bar to around 3 bar, in a specific example 4 bar. In other cases, the hydrogen could be stored as a cryogenically cooled, compressed gas or supercritical fluid.

Figure 2:
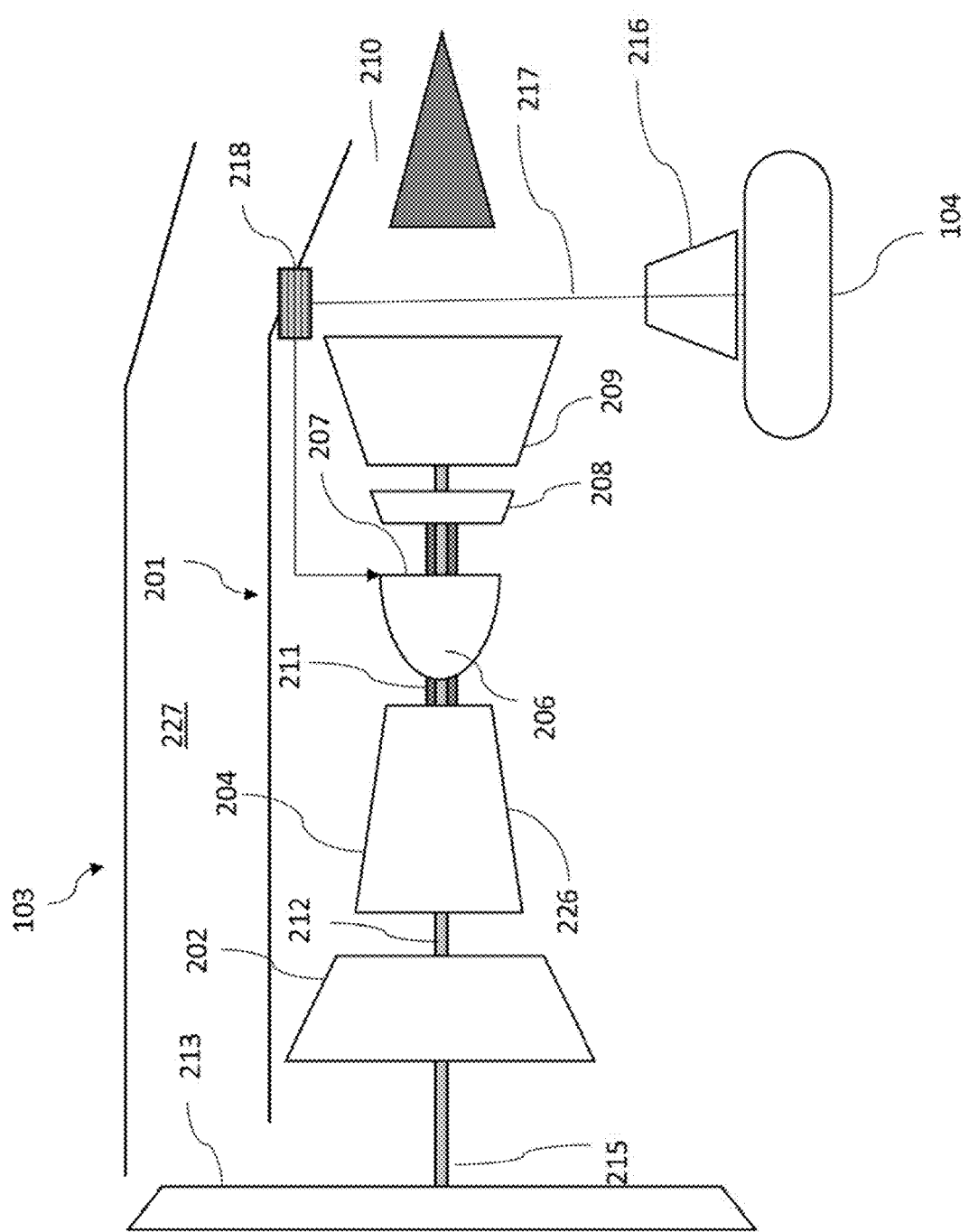
FIG. 2 is a block diagram of one of the engines of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

The turbofan 103 also defines a fan 213, which is driven by the low-pressure turbine 209. The fan provides airflow to the core gas turbine 201, and to a bypass duct 227. As such, distinct bypass and core flows are provided through the bypass passage 227 and gas turbine engine core 201 respectively.

In operation, hydrogen fuel is pumped from the hydrogen storage tank 104 by a pump 216 and into a main fuel conduit 217 which ultimately delivers fuel to the fuel injection system 206.

As will be appreciated, it is desirable to increase the temperature of the fuel from cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 kelvin.

A preheater 218 is therefore provided for heating of the hydrogen fuel. This takes place between the pump 216 and the fuel injection system 206. In an embodiment, the preheater 218 is configured to raise the temperature of the hydrogen fuel to the required injection temperature. The heating may provide a phase change (for example from liquid to supercritical or to gas), or the fluid may remain in a supercritical state after heating by the preheater.

In another embodiment, the preheater 218 is configured to raise the temperature of the hydrogen fuel to an intermediate temperature less than the injection temperature. This could for example be from 60 to 200 kelvin, for example 150 kelvin.

The pre-heater 218 comprises a recuperator heat exchanger configured to exchange heat from the gas turbine engine core exhaust to the hydrogen fuel in the main fuel conduit 217, prior to delivery to the fuel injector 206. In some cases, at certain points in the operational envelope there will be insufficient heat output from the engine to raise the fuel temperature to the injection temperature using the recuperator alone. Such occasions may include, for example, ground start, in-flight relight, end of cruise idle, etc. An such cases, an additional auxiliary preheater (not shown) may be provided.

As will be appreciated, the provision of a recuperator heat exchanger increases the thermal efficiency of the engine, since waste heat that would normally be expelled from the exhaust is reintroduced into the engine cycle via the fuel. However, in studies conducted by the inventors, the advantages of a recuperated cycle are greatly (and in some cases, entirely) offset by reduced propulsive efficiency in view of the flow restriction provided by the recuperator. Additionally, the blockage of the recuperator may increase turbine back pressure, thereby reducing available pressure drop across the turbine, and so reducing turbine work and engine power density. A further disadvantage of recuperated designs is the presence of a relatively delicate heat exchanger in the core engine gas path. Foreign or domestic objects present in the exhaust flow may impinge on the heat exchanger, thereby damaging it. The present disclosure may solve some or all of these problems.

Figure 3:
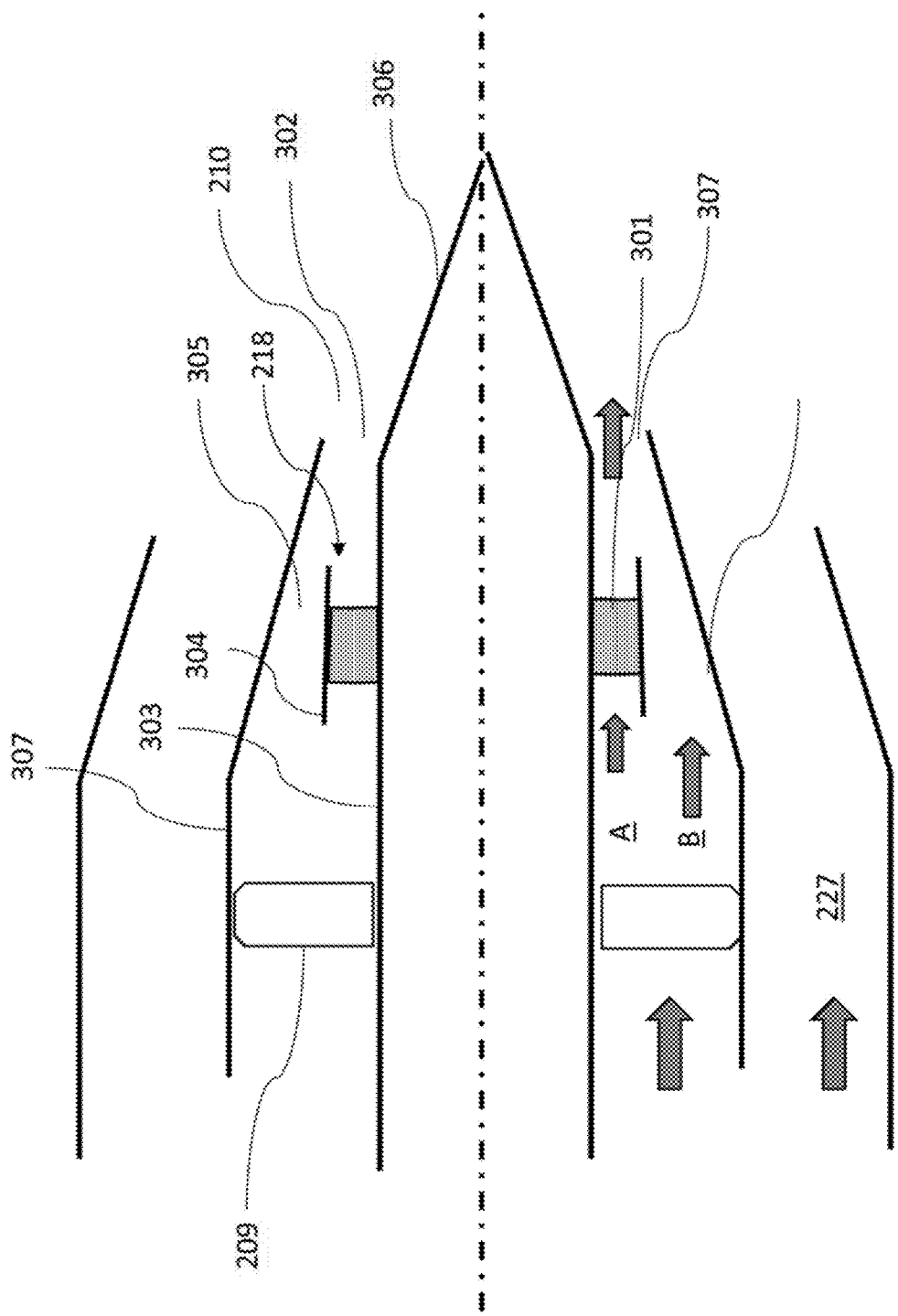
FIG. 3 is a block diagram of an aft part of the engine of FIG. 1.

A first embodiment of the preheater 218 is shown in further detail in FIG. 3 which shows an aft part of the engine 103.

The heat exchanger 218 comprises a heat exchange matrix 301 configured to flow hydrogen fuel through a first set of channels, and hot exhaust air through a second set of channels, to allow for heat exchange therebetween. The heat exchange matrix 301 is provided within a recuperator channel 302 arranged to guide a portion (i.e. less than the whole) of core gas turbine engine exhaust gas flow A. Typically, the recuperator channel is configured to accommodate between 10% and 25% of core mass flow, with the remainder of core mass flow being bypassed. In a particular example, the inventors have found that a preferred range of recuperator mass flow is between 15% and 20%. In engine modelling experiments, the inventors have found that 17% recuperator mass flow provides optimum heat exchange to the fuel without providing excessive blockage of the core exhaust.

The recuperator channel 302 is provided adjacent a radially inner side of the gas turbine engine core, and is mounted to a radially inner side wall 303 aft of the low-pressure turbine 209. The radially inner side wall 303 extends annularly around the engine core to form a core centre body 306, which projects from a rear of the engine 201. The radially inner side wall 303 defines an inner extent of the recuperator channel 302, while a radially outer recuperator duct wall 304 defines a radially outer wall of the recuperator channel. As such, a generally annular duct 302 is defined, which guides core flow generally axially through the duct 302 from an inlet, through the heat exchange matrix, and to an exhaust.

Radially outward of the duct 302 is a core bypass passage 305 through which the remainder of the core flow passes, without extending through the recuperator matrix. This core bypass passage 305 is distinct from the turbofan bypass duct 227, and flows only core flow. The core bypass passage 305 is defined by an annulus between the recuperator channel outer wall 304 and a core outer wall 307. The two flows mix aft of the core bypass passage, and are expelled through the exhaust nozzle 210. As such, a portion of core bypass flow extends out of the exhaust without being restricted by the recuperator heat exchanger 218. This may increase core outlet velocity relative to an engine in which all core flow extends through a recuperator, and may reduce backpressure, thereby increasing turbine effectiveness. These disadvantages may be reduced by employing heat exchanger designs with low pressure drop. However, such designs are typically large and bulky, and may require large diffusion ducts upstream of the heat exchanger. These design compromises may lead to increased overall weight, volume and cost of the propulsion system.

Figure 4:
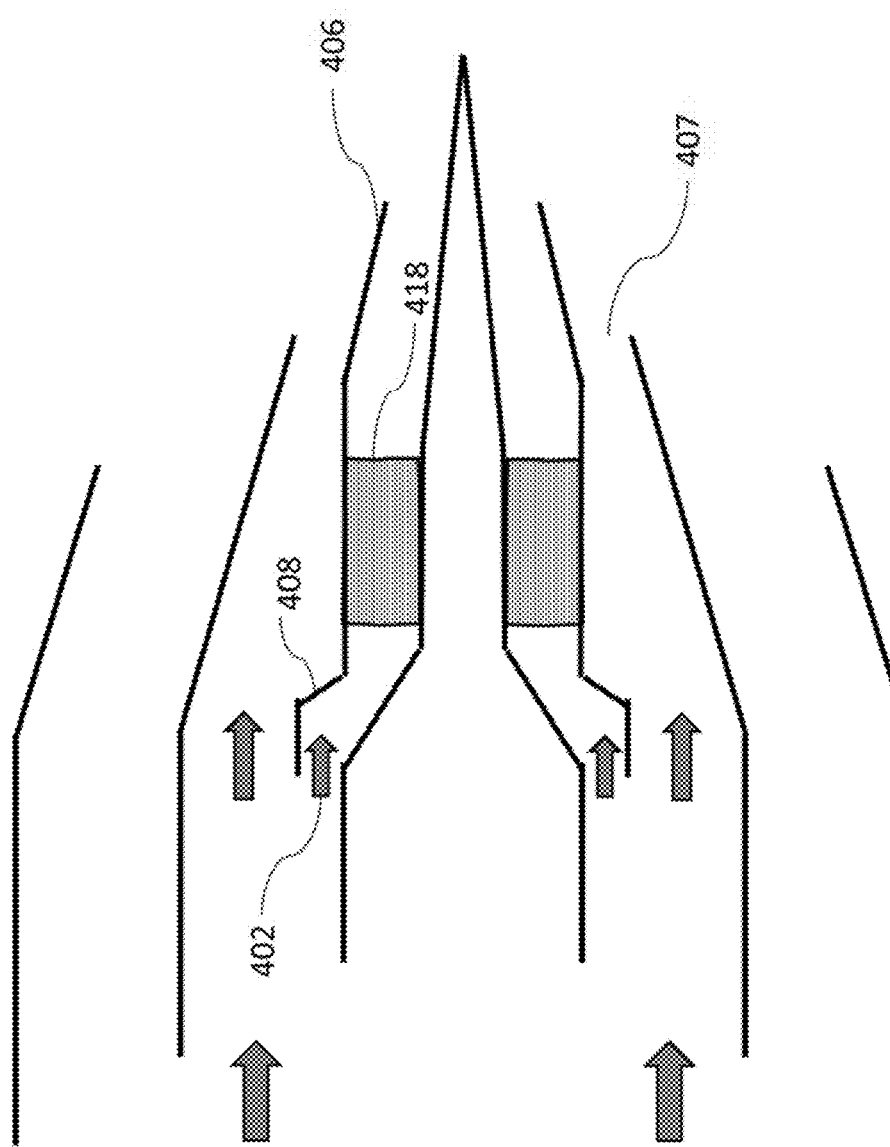
FIG. 4 is a first alternative arrangement of an aft part of the engine of FIG. 1.

FIG. 4 shows a first alternative arrangement of a recuperator heat exchanger 418 in a gas turbine engine core. The arrangement is similar to that shown in FIG. 3, but the recuperator heat exchanger 418 is provided radially relative to the arrangement shown in FIG. 3. The recuperator heat exchanger 418 is provided within the core centre body 406.

A scoop 408 is provided, which extends into the core flow, to ingest a portion of the core flow aft of the turbine 209, which is then redirected to the recuperator heat exchanger 418 through a recuperator channel 402. The remainder of the core flow continues unabated out of the exhaust nozzle 407.

The recuperator channel is divergent from an inlet to the front face of the heat exchanger 418. Consequently, flow velocity is reduced, and pressure is increased. Consequently, heat exchanger effectiveness is increased. In addition, the probability of recuperator damage is reduced in view of the lower velocity, and the presence of the inlet at a low radial position, since particles in the exhaust are likely to be concentrated at the radially outer wall of the turbine. In some cases, a diverter (not shown) may be provided in the recuperator channel to further reduce the probability of debris damage.

Consequently, the recuperator is provided within a space that is normally empty, thereby improving engine packaging. Furthermore, engine core flows relatively uninterrupted through the gas turbine engine exhaust, thereby improving propulsive efficiency. Additionally, the recuperator is protected from damage.

Figure 5:
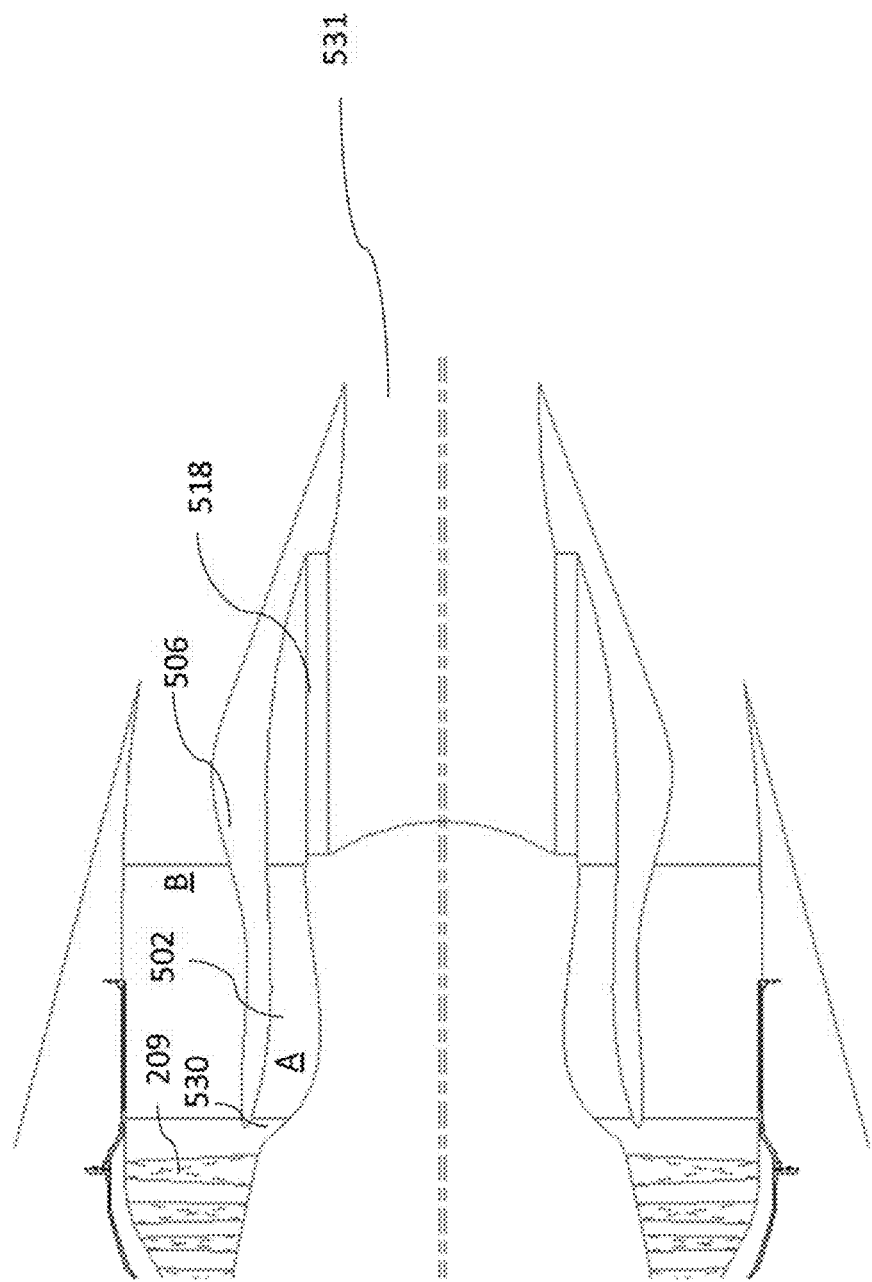
FIG. 5 is a second alternative arrangement of an aft part of the engine of FIG. 1.

FIG. 5 shows a second alternative arrangement of a recuperator heat exchanger 518. In this arrangement, the recuperator heat exchanger 518 is again provided within a duct 502 within the centre body 506. However, in this arrangement, the heat exchanger 518 and duct 502 are configured such that core flow flows generally axially from an inlet 530 toward the recuperator 518 before being turned generally radially inwardly and flowing through the recuperator 218 heat exchange matrix in a generally radially inward direction. Flow downstream of the recuperator 518 is again turned to a generally axial direction, where it flows out of the engine through a recuperator exhaust 531 the centre of the centre body 506.

The recuperator 518 has a generally annular profile, and is arranged to flow core flow radially inward. Alternatively, the recuperator 518 may be part annular. As such, a relatively large area can be provided, since inlet flow area can be increased by increasing the axial extent of the recuperator 518. The combination of large area and low velocity results in high heat exchange effectiveness for a given mass flow. Consequently, a relatively small quantity of air A can be drawn from the core flow, and decelerated to relatively slow velocities, before flowing through the recuperator heat exchanger 518. As such, the impact on turbine backpressure and recuperator bypass flow B is still further reduced, while a high rate of heat transfer is maintained.

Figure 6:
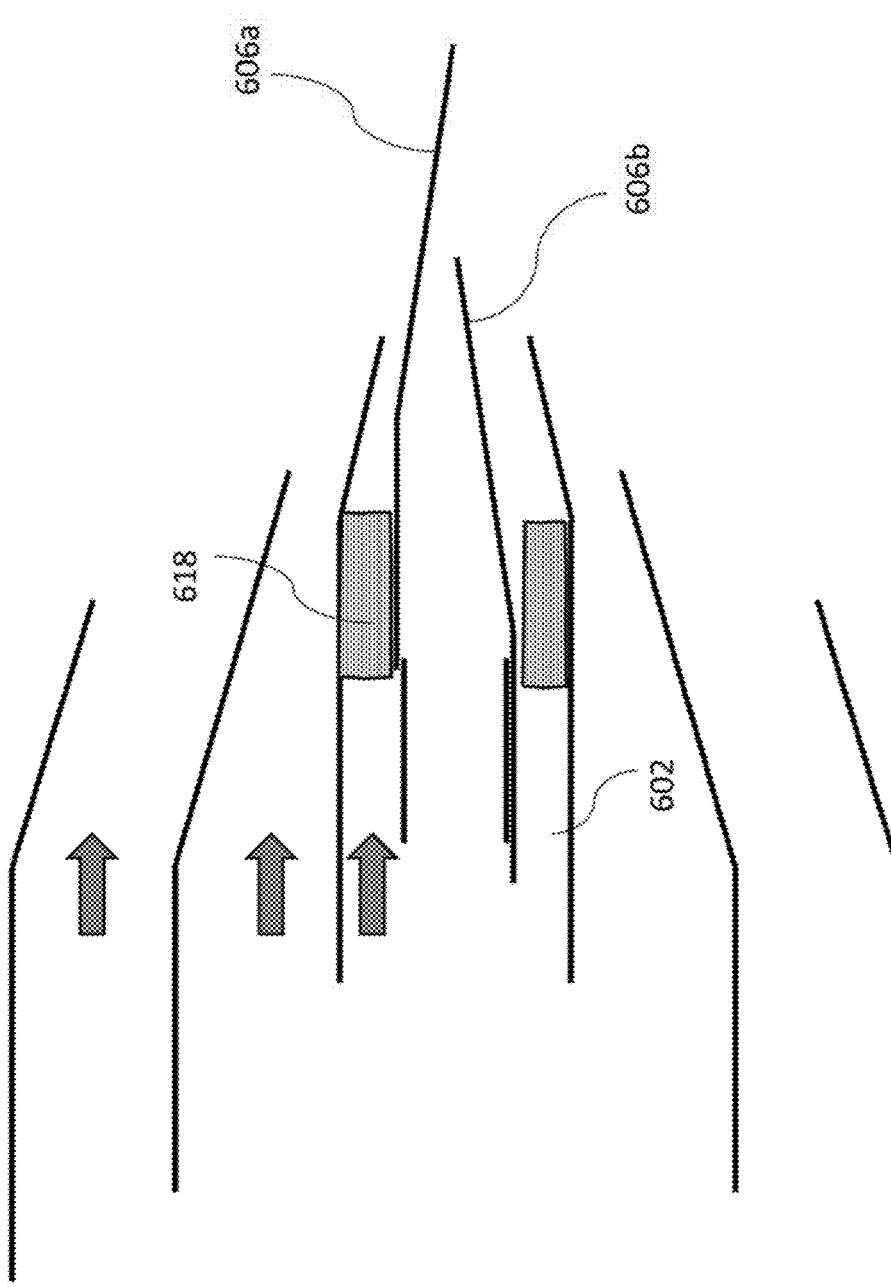
FIG. 6 is a third alternative arrangement of an aft part of the engine of FIG. 1.

FIG. 6 shows a third alternative arrangement of the recuperator heat exchanger 618. The arrangement is similar to that shown in FIG. 4, but with the addition of a translating centre-body configured to control the outlet area of the recuperator channel 602.

The upper half of FIG. 6 shows the centre body translated aft, such that the outlet area of the recuperator channel 602 is reduced, whereas the lower half of FIG. 5 shows the centre body translated forward such that the outlet area of the recuperator channel 602 is increased. By changing the outlet area, the mass flow and/or velocity through the channel 602 can be controlled, thereby controlling heat input to the fuel within the recuperator 618. Consequently, fuel temperature can be controlled independently of engine core flow and temperature. For example, during operation at low power, fuel flow will typically be low, while core flow velocity will also be low, while core temperature may remain high. As such, the temperature rise of the fuel may be excessive under these conditions. Consequently, mass flow can be decreased by closing the nozzle, thereby reducing heat input. In some cases, the nozzle may be controlled completely, thereby halting heat input to the fuel. As will be appreciated, other flow control means could be employed, such as valves of various types.

Figure 7A:
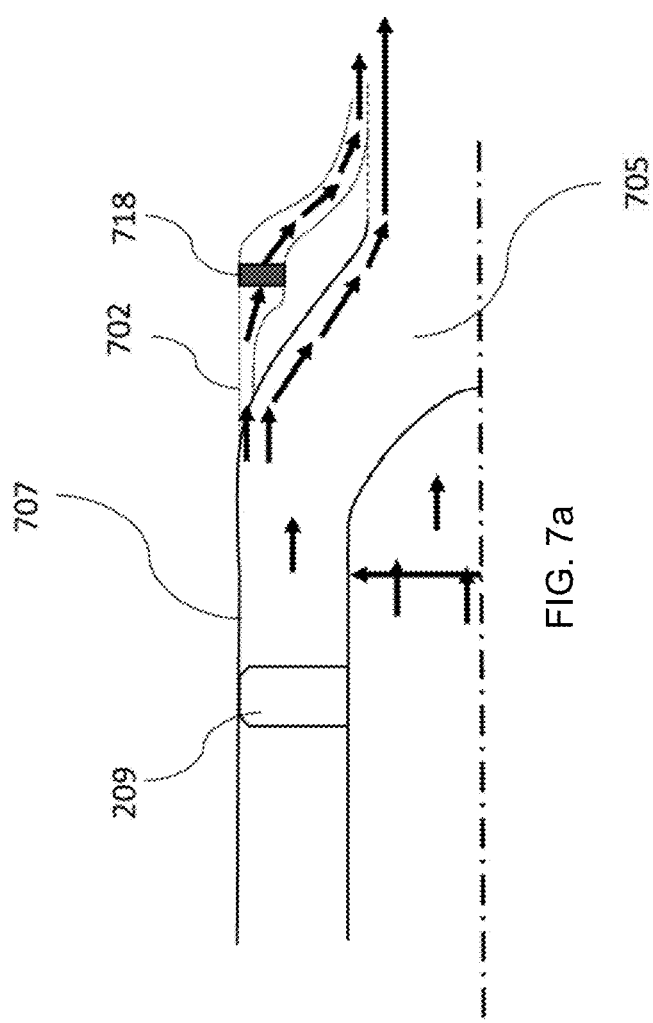
FIG. 7a is a fourth alternative arrangement of an aft part of the engine of FIG. 1, showing a cross sectional side view.
Figure 7B:
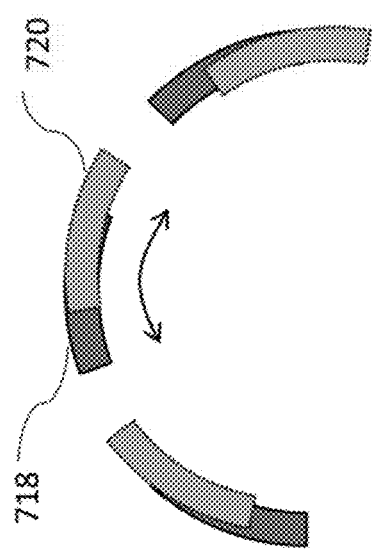
FIG. 7b is a fourth alternative arrangement of an aft part of the engine of FIG. 1, showing a cross-sectional end view.

FIGS. 7a and 7b show a fourth alternative arrangement of the recuperator heat exchanger 718.

In this arrangement, the recuperator channel 702 is provided at a radially outer portion of the engine core, adjacent a core outer wall 707 of the engine, with the recuperator heat exchanger 718 being provided within the recuperator channel 702, and a core bypass being provided radially inwards. This arrangement provides the cooler, lower velocity air from the recuperator heat exchanger at the outer radius of the core exhaust, providing intermediate temperature and velocity airflow between the core and bypass flows, which may result in lower noise output from the engine.

As shown in FIG. 7b, the recuperator channel comprises a valve arrangement comprising a plurality of rotatable covers, which can rotate in the directions shown by the arrows to cover or uncover the heat exchange matrix 718. As such, the mass flow and/or velocity of air through the heat exchangers can be managed.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A propulsive aircraft gas turbine engine comprising:
a turbine disposed in a gas turbine engine core flow;
a recuperator heat exchanger disposed downstream of the turbine in the gas turbine engine core flow, the recuperator heat exchanger being configured to 1) receive a portion of the gas turbine engine core flow, 2) receive gas turbine engine fuel and 3) transfer heat from the portion of the gas turbine engine core flow to the gas turbine engine fuel, wherein an entirety of the recuperator heat exchanger is located downstream of the turbine;
wherein the recuperator heat exchanger is configured to accommodate the portion of the gas turbine engine core flow therethrough, a remainder of the gas turbine engine core flow being bypassed around the recuperator heat exchanger.

2. A gas turbine engine according to claim 1, wherein the recuperator heat exchanger is configured to accommodate between 10 and 25% of the gas turbine engine core flow, with the remainder of the gas turbine engine core flow being bypassed around the recuperator heat exchanger.

3. A gas turbine engine according to claim 1, wherein the gas turbine engine is configured to burn hydrogen fuel.

4. A gas turbine engine according to claim 1, wherein the recuperator heat exchanger is installed adjacent a radially inner wall of a gas turbine core exhaust nozzle.

5. A gas turbine engine according to claim 4, wherein the gas turbine engine core exhaust nozzle comprises a generally radially inner recuperator flow and a generally radially outer core bypass flow.

6. A gas turbine engine according to claim 5, wherein the recuperator heat exchanger is provided within a core centre body of the gas turbine engine, aft of the turbine.

7. A gas turbine engine according to claim 6, wherein the gas turbine engine comprises an axially translating turbine centre body configured to vary an outlet area of the recuperator heat exchanger.

8. A gas turbine engine according to claim 1, wherein the gas turbine engine comprises a recuperator channel arranged to guide the gas turbine engine core flow from an exit of the turbine, through the recuperator heat exchanger, and out a recuperator exhaust.

9. A gas turbine engine according to claim 8, wherein the recuperator channel is configured to redirect flow from a generally axial direction from the exit of the turbine to a generally radially inward flow through a heat exchange matrix of the recuperator heat exchanger.

10. A gas turbine engine according to claim 9, wherein the recuperator channel is configured to redirect flow from a generally radially inward direction from the heat exchange matrix to a generally axial direction out the recuperator exhaust.

11. A propulsive aircraft gas turbine engine comprising:
a turbine disposed in a gas turbine engine core flow;
a recuperator channel arranged to guide a portion of the gas turbine engine core flow therethrough from an exit of the turbine, a remainder of the gas turbine engine core flow flowing around and bypassing the recuperator channel;
a recuperator heat exchanger disposed in the recuperator channel downstream of the turbine to receive the portion of the gas turbine engine core flow and gas turbine engine fuel therethrough, the recuperator heat exchanger being configured to transfer heat from the portion of the gas turbine engine core flow to the gas turbine engine fuel; and
an axially translating turbine centre body arranged radially inward of the recuperator heat exchanger and configured to axially translate to vary an outlet area of the recuperator channel so as to control heat input into the gas turbine engine fuel within the recuperator heat exchanger.

12. A propulsive aircraft gas turbine engine of claim 11, wherein the axially translating turbine centre body is configured to translate axially aft to decrease the outlet area of the recuperator channel.

13. A propulsive aircraft gas turbine engine of claim 12, wherein the axially translating turbine centre body is configured to translate axially forward to increase the outlet area of the recuperator channel.

14. A propulsive aircraft gas turbine engine of claim 11, wherein a core bypass passage is defined radially outward of the recuperator channel, and wherein the remainder of the gas turbine engine core flow flows through the core bypass passage.

15. A propulsive aircraft gas turbine engine of claim 14, wherein an outlet area of the core bypass passage remains constant while the axially translating turbine centre body axially translates forward or aft.

16. A propulsive aircraft gas turbine engine comprising:
a turbine disposed in a gas turbine engine core flow;
a recuperator channel arranged to guide a portion of the gas turbine engine core flow therethrough from an exit of the turbine, a remainder of the gas turbine engine core flow flowing around and bypassing the recuperator channel; and
a recuperator heat exchanger disposed in the recuperator channel downstream of the turbine to receive the portion of the gas turbine engine core flow and gas turbine engine fuel therethrough, the recuperator heat exchanger being configured to transfer heat from the portion of the gas turbine engine core flow to the gas turbine engine fuel;
wherein the portion of the gas turbine engine core flow and the remainder of the gas turbine engine core flow mix with one another axially forward of an aftmost end of a core centre body.

17. A propulsive aircraft gas turbine engine of claim 16, wherein the recuperator heat exchanger is located entirely downstream of the turbine.

18. A propulsive aircraft gas turbine engine of claim 16, wherein the recuperator heat exchanger is located radially outward of and adjacent a side wall of the core centre body, and wherein the side wall of the core centre body defines a radially inner extent of the recuperator channel and a duct wall arranged radially outward of the recuperator heat exchanger defines a radially outer extent of the recuperator channel.

19. A propulsive aircraft gas turbine engine of claim 18, wherein a core bypass passage is defined radially between the duct wall and a core outer wall located radially outward of the duct wall.

20. A propulsive aircraft gas turbine engine of claim 19, wherein a terminal end of the core outer wall is located axially forward of the aftmost end of the core centre body, and wherein a terminal end of the recuperator channel is located axially forward of the terminal end of the core outer wall such that the portion of the gas turbine engine core flow and the remainder of the gas turbine engine core flow mix with one another axially forward of the terminal end of the core outer wall.

* * * * *